United States Patent [19]

Giulie

[11] 4,410,224
[45] Oct. 18, 1983

[54] INTERCONNECTION DEVICE FOR MULTIPLE CONDUCTOR CABLES

[75] Inventor: Joe D. Giulie, Palo Alto, Calif.

[73] Assignee: Ico Rally Corporation, Palo Alto, Calif.

[21] Appl. No.: 295,539

[22] Filed: Aug. 24, 1981

[51] Int. Cl.³ .............................................. H01R 9/16
[52] U.S. Cl. .............................. 339/18 R; 339/116 R
[58] Field of Search ................. 339/18 R, 18 B, 18 C, 339/18 P, 103 R, 103 M, 113 R, 113 B, 116 R

[56] References Cited

U.S. PATENT DOCUMENTS

| | | | |
|---|---|---|---|
| 2,594,069 | 4/1952 | Poehlmann | 339/18 P |
| 2,660,679 | 11/1953 | Hunt | 339/18 P UX |
| 2,963,897 | 5/1961 | Blanchet | 339/113 B X |
| 3,055,971 | 9/1962 | Lander | 339/103 M X |
| 3,056,942 | 10/1962 | Carbaugh et al. | 339/103 M X |
| 3,085,220 | 4/1963 | Sitz | 339/18 B |

*Primary Examiner*—Howard N. Goldberg
*Assistant Examiner*—Timothy V. Eley
*Attorney, Agent, or Firm*—Robert G. Slick

[57] ABSTRACT

An interconnection device is provided for multiple conductor cables wherein one of the cables has conductors terminating in a plurality of pins while the other cable has conductors terminating in a series of sockets whereby the pins may be placed in any of the sockets to alter the connections from one end of the cable to the other. The device of the present invention is particularly suitable for use in connecting computers to peripheral equipment.

5 Claims, 11 Drawing Figures

INTERCONNECTION DEVICE FOR MULTIPLE CONDUCTOR CABLES

SUMMARY OF THE INVENTION

Multiple conductor cables are used for many purposes and the present invention particularly relates to cables suitable for connecting a computer to peripheral equipment such as displays, printers, modems or the like. Each computer manufacturer has its own series of connecting cables and ordinarily the cables from one manufacturer are not compatible with those of another.

Frequently it is desired to connect two pieces of equipment which may not be made by the same manufacturer so that they do not embody the same cable configuration. Although special cables are made for such a purpose, it is ordinarily not practical for an individual store to stock all of the possible cable combinations.

Cables for interconnecting computers and other devices terminate in plugs which may contain as few as four or as many as fifty conductors. A very common form of plug is the twenty-five pin plug and it is frequently used even when a much smaller number of conductors is actually employed in the cable. Since the plugs can have different numbers of pins as well as different configurations of the conductors and since the cables themselves may be of different lengths, literally thousands of different cable configurations are possible, making it impractical for an ordinary store or jobber to keep all of the cables which might be called for in stock.

Accordingly, it is an object of the present invention to provide an interconnection device for two cable components so that a relatively small number of stock cable components can be used to make up any desired cable configuration.

As is pointed out above one of the disadvantages of prior art cables is that the same type cable may be required in a variety of lengths. In accordance with one aspect of the present invention, two of the interconnection devices of the present invention may be employed in conjunction with each other so that cables of varying lengths can be made with the fewest number of stock parts.

Obviously a mechanic can make up cables in any desired configuration but this requires tools and soldering or crimping. In contrast, the cables of the present invention can be made up without tools of any kind by unskilled workers.

Another objection to prior art cable coupling devices is that the plugs on either end of the prefabricated cables are ordinarily very large. This makes it impossible to thread the cable through conduits or other small places. In contrast, the connector of the present invention is relatively small and employs a flexible end cap so that one can thread the cable through an extremely small opening.

The present invention provides improved strain relief over prior art connectors in that only the tough outer covering of the cable is subject to stress and the conductors and connections are not strained in any manner.

Various other objects and features of the invention will be brought out in the balance of the specification.

BRIEF DESCRIPTION OF THE DRAWINGS

FIG. 5 is a section through a connector showing some of the pins plugged in.

DESCRIPTION OF THE PREFERRED EMBODIMENTS

Figure 1:
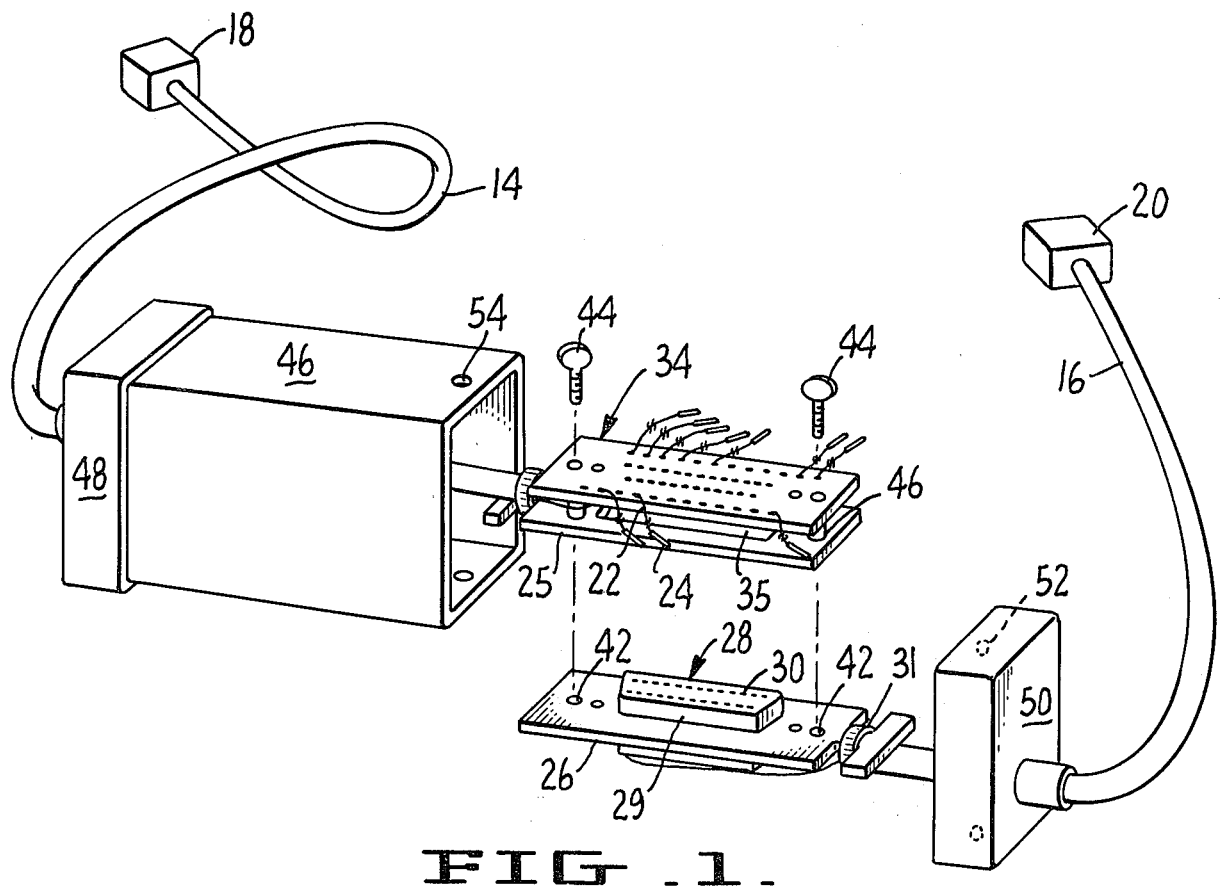
FIG. 1 is an exploded, perspective view of a device embodying the present invention.
Figure 2:
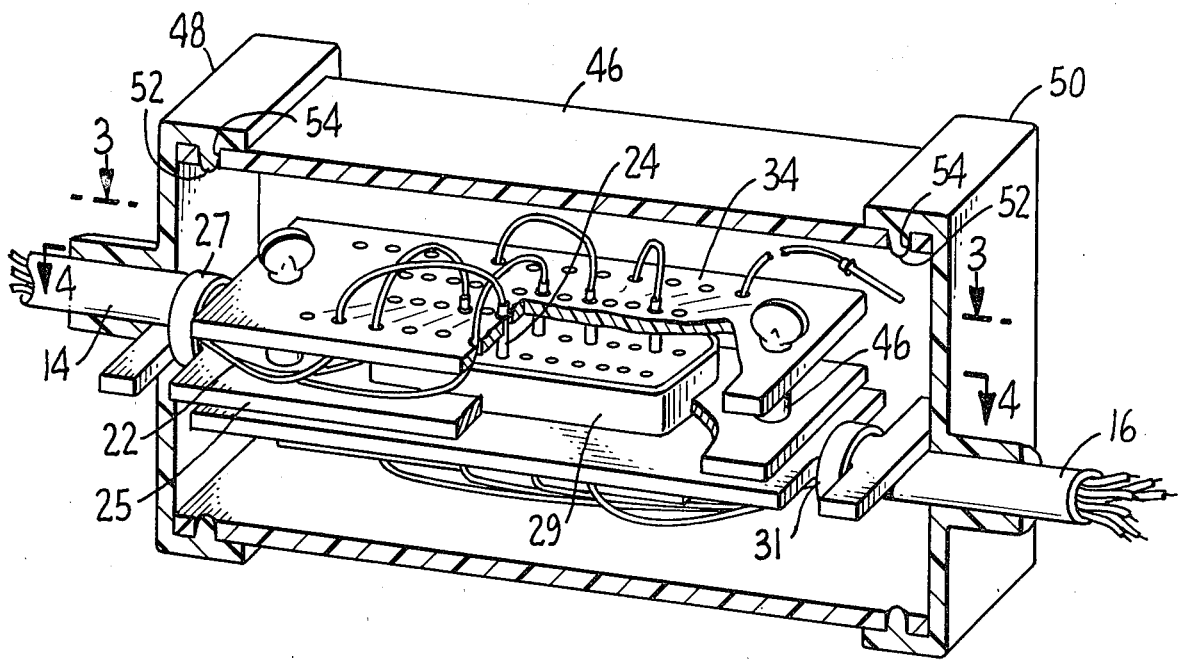
FIG. 2 is an enlarged cross-sectional view of a connector embodying the present invention.

Referring now to the drawings by reference characters and particularly to FIGS. 1-5, the device of the present invention includes a first cable component 14 and a second cable component 16 each having the usual connectors 18 and 20 at their respective distal ends. In the embodiment illustrated, each of the connectors has twenty-five conductors, since this is the most frequently used conductor for computer interconnections. However, it will be understood that this is only for purposes of illustration and the connectors might have any number of conductors. Further, it is assumed that all of the available pins and sockets on the plugs are used for conductors, but this is not necessarily true in a practical computer installation.

Cable 14 has a plurality of wires 22, each of which terminates at the proximal end in a pin 24. Cable 14 is attached to a plate 25 by means of a band 27 to provide for strain relief. The opposite cable 16 carries a plate 26 at its proximal end having a jack pannel 28 with a boss 29 which extends upward through plate 26 and which contains a number of individual sockets as at 30. Plate 26 has a band 31 which encircles the outside of cable 16 to provide for strain relief. The individual wires in the cable 16 go to the individual sockets in the jack pannel 28 such as the one designated 30.

Figure 3:
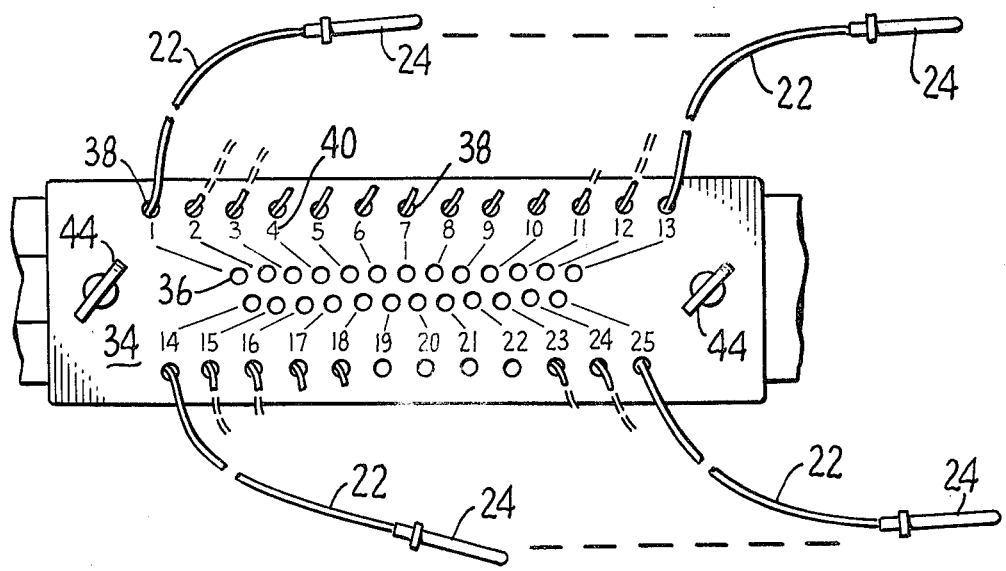
FIG. 3 is a plan view of the device on the line 3—3 of FIG. 2.
Figure 4:
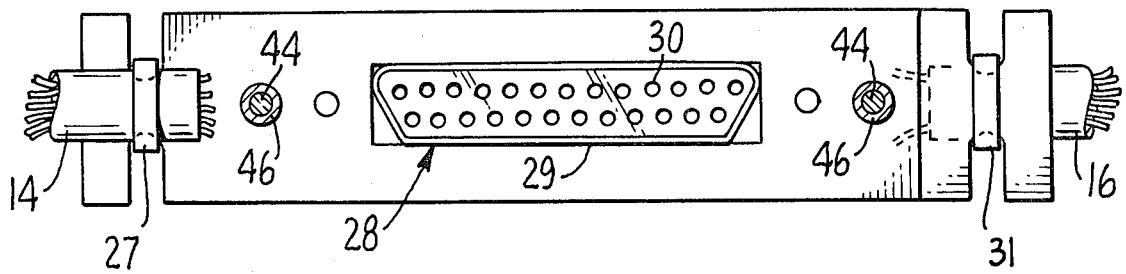
FIG. 4 is a section on the line 4—4 of FIG. 2.
Figure 5:
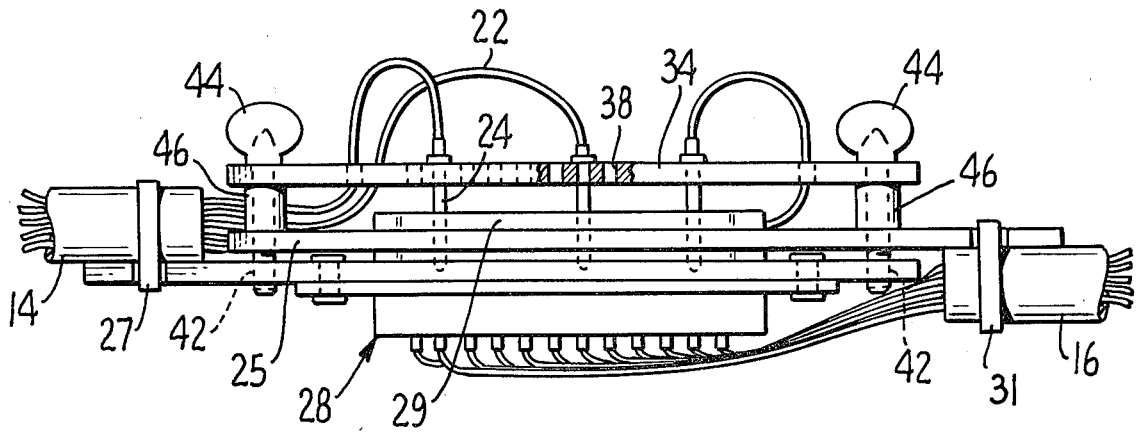

Plate 25 has a rectangular opening 35 which is complementary to the outline of the boss 29. In addition, a guide plate 34 of an insulating material, such as sheet plastic, is provided which has a plurality of central holes 36 corresponding in number and placement to the individual socket holes 30 which in turn correspond to the pin numbers of the connector at the cable end. Plate 34 also has a plurality of outside holes 38 which would normally correspond in number to the inner holes 36 and the individual sockets 30. The exact location of these holes is not critical. Normally the plate 34 is provided with indicia as at 40 to identify the holes 36. Although the numbering would apply in most cases to the outer holes, as is shown in FIG. 3, the number of the outer holes is not at all critical since they do not provide any electrical connection and only serve to identify and hold as well as position the wires. Hollow rivets 46 connect plates 25 and 34 together. Normally the wires as at 22 would be color coded and the interconnector device would come with a set of instructions so that if one would wish to connect a certain make of computer with a certain make of printer, the instructions might read: ". . . place the red wire in socket 8 . . . " and so on.

On the other hand, the wires of cable 14 might merely be brought upward through the numbered holes in plate 34 for identification. In this case the instructions might read: ". . . place pin from wire in hole 24 into socket 3 . . ."

Figure 11:
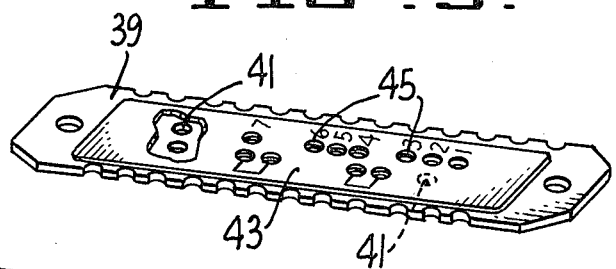
FIG. 11 is a perspective view of a cable key plate.

FIG. 11 illustrates a "cable key" plate which is a small, flat plate 39 designed to lie over plate 34 and which has graphic instructions showing where jumpers go and where the various numbered wires would be plugged in. Such a plate obviates the need for printed instructions.

The instruction plate is constructed of a punched plastic sheet 39 with all corresponding holes 41 to the socket punched. A paper pressure sensitive label 43 is placed over the central area covering the holes. By use of a paper punch or any pointed object such as a pencil, the technician can poke out only those holes 45 in the label which are applicable and indicate the proper pin numbers next to each hole as shown in FIG. 11.

The bottom plate 26 is threaded as at 42 while the plates 25 and 34 have mating hollow rivets 46 so that the thumb screws 44 can pass down through the rivets, holding the assembly firmly together.

The assembly is completed with an outer cover 46 and ends 48 and 50. The ends have inwardly extending nipples 52 while there are mating holes 54 in each end of the cover 46 so that the ends merely snap into place. Notches with mating ridges might also be used.

Normally, the device would be sold with the cable 14, plug 18, cover 48 and plates 25 and 34 assembled as a unit with the wires with the pins attached merely extending from the end of the cable and up through the outer holes of plate 34. The opposite cable would be sold with the cable 16, plug 20, cover 50 attached to plate 26 with the individual wires within the cable fastened to the individual sockets as at 30. The user would place the plates 25 and 34 over plate 26 and insert the thumb screws 44, to complete the assembly. The pins 24 would pass down through a hole in plate 34 and into a desired socket 39. The covers 46 and 48 are now merely pushed along the cable to cover the interconnector.

It should be noted that both the plates 25 and 34 are very narrow so that they can be passed through an ordinary conduit. The covers 48 and 50 are ordinarily made of soft rubber or plastic so that they can be distorted and also drawn through a conduit.

Figure 6:
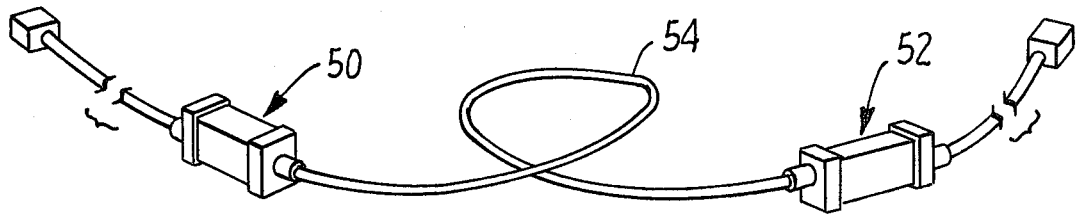
FIG. 6 is a perspective view showing the use of two of the interconnecting devices to provide a long cable.

As was pointed out previously, there is a demand for cables of different lengths and lengths such as 10', 25' and 50' are common. In FIG. 6 it is illustrated how two of the interconnectors of the present invention can be used so that it is not necessary for a dealer to stock cables in all desired lengths with all possible plugs. Here a first interconnector, generally designated 50 is connected to a second interconnector 52 through an intermediate cable 54. Thus a dealer need only carry the intermediate cable 54 in three lengths to satisfy practically every user. Another way to supply various lengths is to have one cable component of various lengths such as 10, 25 and 50 feet and mated with the second cable component which is short, about 1 foot long. Cable component 16 is connected to the appropriate length of cable component 14 to give a finished cable of the appropriate length.

Figure 7:
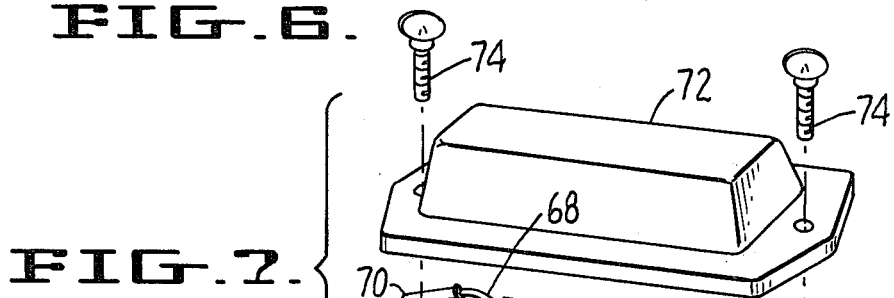
FIG. 7 is an exploded view of another embodiment of the invention.

FIG. 7 illustrates another embodiment of the invention wherein molded plugs and sockets are employed. Here the cable 56 is molded into a plate 58 which has a plurality of holes 60 in the central portion thereof. Cable 62 is molded into a jack pannel 64 having a plurality of sockets as at 66, connected to the individual wires in the cable 62. The individual wires of a cable 56 as at 68 terminate in pins 70. To use the device, one merely places the plate 58 over the plate 64 and then inserts the pins 70 through holes 60 into the desired sockets 66. Now it is only necessary to place the cover 72 over the assembled plates and hold the two plates together by means of thumb screws 74.

Figure 8:
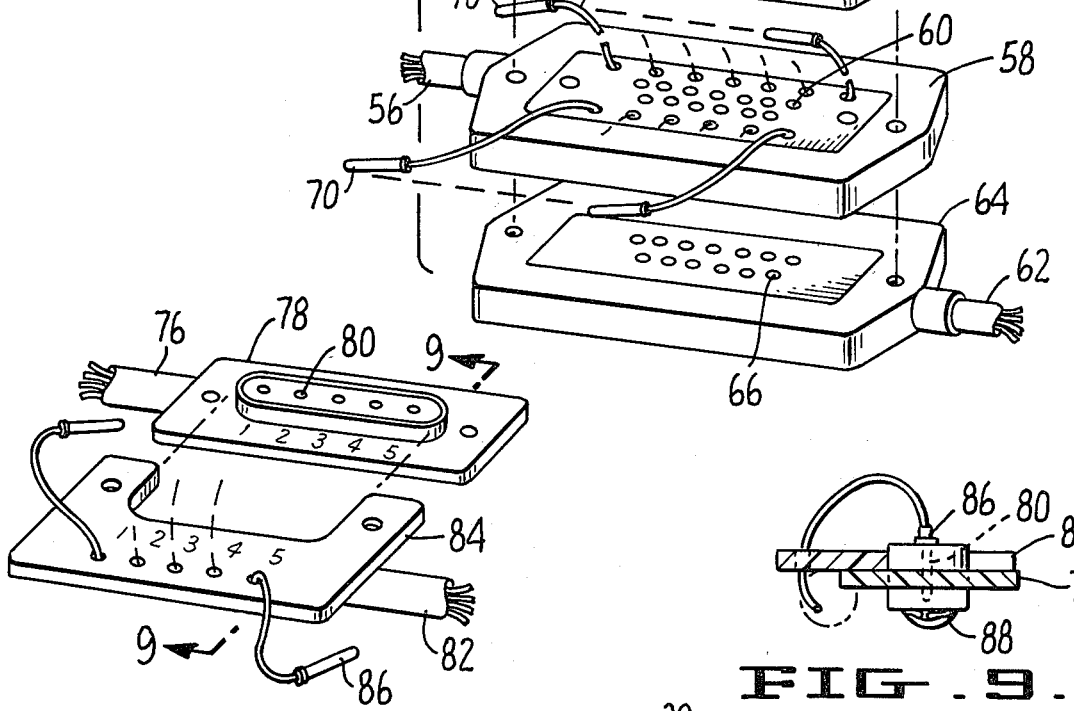
FIG. 8 is a perspective view of still another embodiment of the invention.
Figure 9:
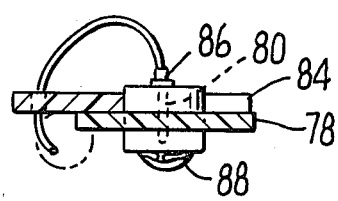
FIG. 9 is a section on the line 9—9 of FIG. 8.

FIGS. 8 and 9 show a simplified version of the invention which is particularly adapted for use in those situations wherein the cables carry a relatively small number of conductors. Here the cable 76 is connected to a jack pannel 78 which carries a plurality of individual sockets 80. Cable 82 carries a plate 84 with a cut out adapted to fit around the boss of plate 78 and the individual conductors from the cable 82 terminate in the pins 86. It is merely necessary to slide the two plates together, place the pins 86 into the proper sockets 80 then hold the two plates together by means of a screw 88.

Figure 10:
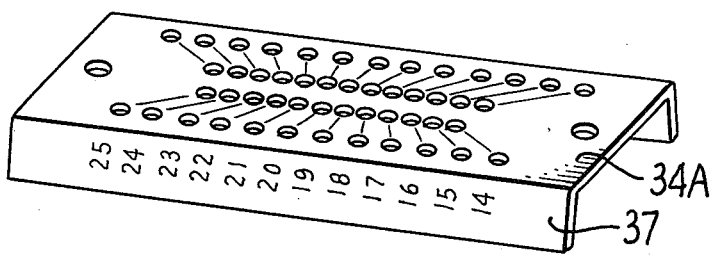
FIG. 10 is a perspective view of an alternate form of guide plate.

FIG. 10 illustrates an alternate form of guide plate. The plate designated 34A is in the form of an inverted "U" with downturned sides 37. Indicia indicating the hole numbers may be placed on the sides 37.

Frequently, it is necessary to jumper two or more sockets together or to jumper two or three pins together. Suitable jumpers are well known and are not illustrated.

Certain specific embodiments of the invention have been illustrated but it will be apparent to those skilled in the art that many departures can be made from the exact structure shown without departing from the spirit of this invention.

I claim:

1. An interconnection device for connecting first and second cables wherein each of said cables has a plurality of conductors comprising in combination:
   a. said first cable having a plurality of conductors, at least some of said conductors terminating in individual pins,
   b. a first flat plate having an elongated opening therein, said first flat plate being connected to said first cable,
   c. a second flat plate underlying said first plate and carrying an upstanding jack pannel socket having a plurality of individual sockets therein, and extending into the opening in said first plate, said second plate being fastened to said second cable,
   d. a third plate extending over said second plate, said third plate being of an insulating material and having a plurality of holes corresponding in placement and number to the individual sockets of the second plate, and
   e. said three plates lying parallel to each other and means for fastening the three plates together.

2. The interconnection device of claim 1 having a flexible snap on cover.

3. An interconnection device in accordance with claim 1 wherein each of said plates has an extension thereon anchored to the outside of its mating cable whereby the individual conductors of each cable are not subject to strain.

4. The interconnection device of claim 1 wherein said third plate has a downturned protective rim on each side thereof.

5. The interconnection device of claim 1 wherein said third plate is provided with an instruction plate, said instruction plate consisting of:
   a. a thin insulation sheet having holes corresponding to all the socket holes and
   b. an overlying indicia sheet of a material such as paper whereby the indicia sheet may be punched with just those holes to which a connection is to be made.

* * * * *